Figure 1:
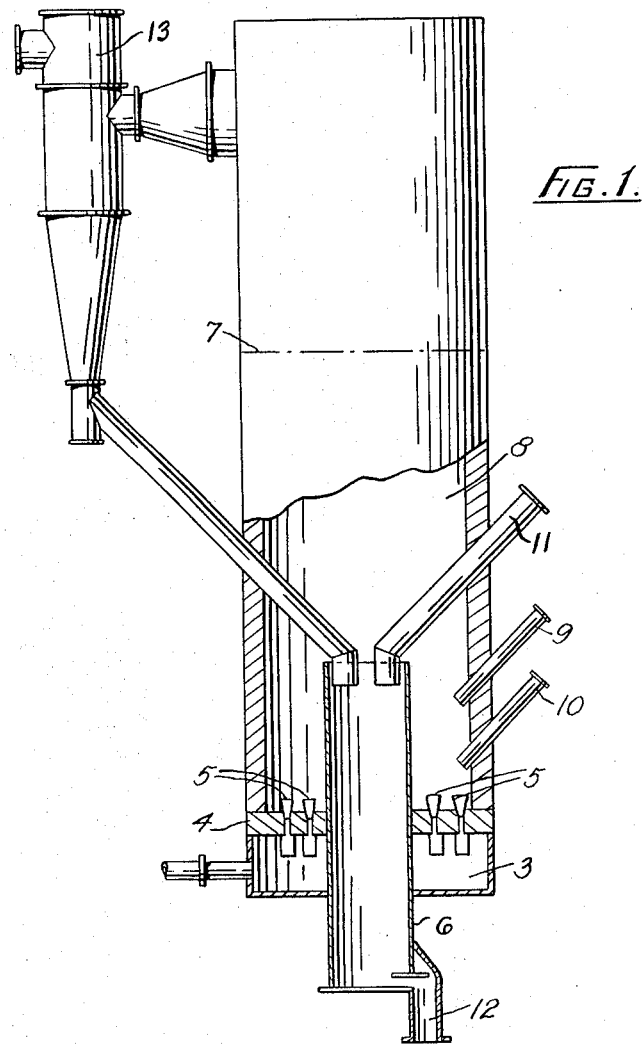

Jan. 24, 1967   N. PLINT   3,300,299
SEGREGATION PROCESS
Filed Oct. 1, 1964   2 Sheets-Sheet 1

INVENTOR
NOEL PLINT
By Irwin S. Thompson
ATTY.

3,300,299
SEGREGATION PROCESS

Noel Plint, Nchanga, Northern Rhodesia, assignor to Anglo American Corporation of South Africa Limited, Johannesburg, Transvaal, Republic of South Africa
Filed Oct. 1, 1964, Ser. No. 400,754
Claims priority, application Southern Rhodesia, Oct. 7, 1963, 561/63
9 Claims. (Cl. 75—72)

This invention relates to the segregation process for the recovery of metals from their ores.

The segregation process has been described largely in relation to the recovery of copper from its ores although there is a case on record where silver has been recovered in conjunction with copper. In the literature mention is also made of other metals, but applicant is not aware of any successful case of segregation with these other metals.

In the segregation process, the ore is heated to a high temperature below the melting point of copper, then mixed with a carbonaceous reducing agent in the presence of a halogen or a halogen compound, usually sodium chloride, in an inert or reducing atmosphere, whereupon copper is reduced, and the reduced copper directly or after light grinding is recovered in a suitable process such as froth flotation.

The published literature on the segregation process suggests that the basic chemistry of the process is based on the reduction of copper compounds by carbon with the halogen as the volatilizing agent. This theory is supported by the fact that attempts to carry out the process in a fluidized bed failed. The gas stream necessary to fluidize and heat the charge sweeps away volatile compounds before they are able to decompose on the carbonaceous material. For this reason, prior workers have proposed to carry out the process in rotary kilns, rabble furnaces and shaft furnaces (with pelletized feed).

It should be noted that some workers carried out the process in two stages: the first consisting in heating the charge and the second in adding reagents to the heated charge, but these workers did not carry out their work in fluidized bed reactors.

An object of the invention is to provide a process in which fluidized bed techniques are employed.

A process according to the invention consists in the steps of fluidizing discrete mineral-bearing material under conditions causing the material to be heated to a predetermined temperature, withdrawing heated material from the fluidized mass, causing material thus withdrawn to move as a continuous sealed plug at a predetermined rate over a predetermined distance, and adding reagents necessary for the segregation reaction to the initial portion of the plug.

Apparatus according to the invention consists in a fluidized bed reactor comprising a reactor space, means for passing fluidizing gas through the space, means to feed discrete particles into the reactor space, means to withdraw discrete particles from the space and an outlet for exhaust fluidizing gas; a cylindrical vessel the top of which is fed by the withdrawing means and the bottom end of which is controlled by means allowing a restricted discharge from the vessel and means to feed reagents to the top of the vessel.

The invention is further discussed with reference to the accompanying drawings, in which—

Figure 2:
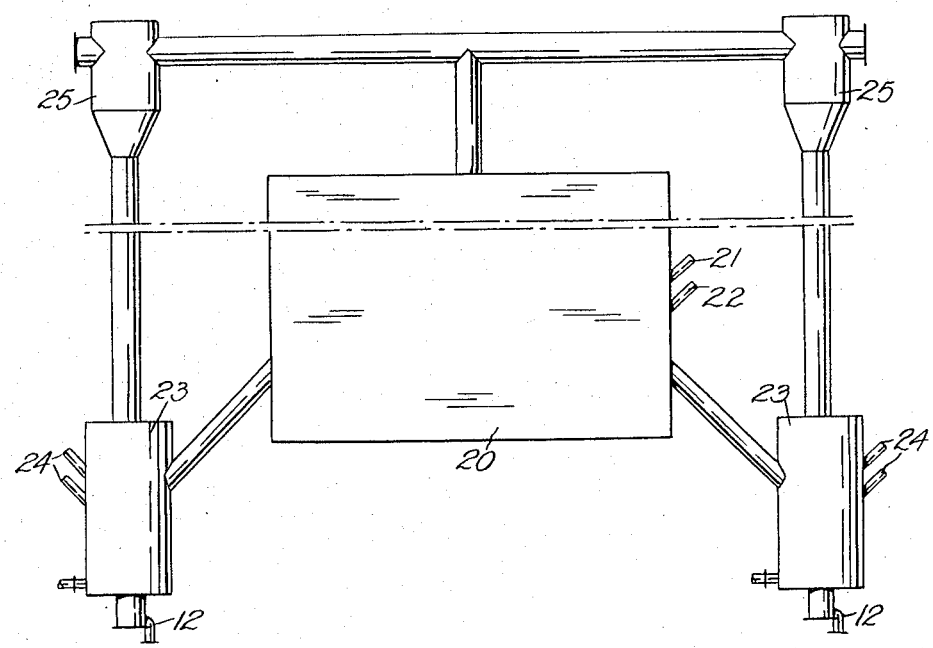

FIGURE 1 is a diagrammatic view, partly in section, of apparatus for carrying out the process of the invention, and FIGURE 2 is a diagrammatic view of a modified form of apparatus.

In FIGURE 1 the equipment consists of a cylindrical fluidized bed reactor. There is a windbox 3 below the floor 4 of the reactor and the floor 4 is pierced by suitable tuyeres 5. A central standpipe 6 pierces the floor and the windbox and extends to below the level 7 proposed for fluidized solids in the reactor space 8.

Fluidized reactors of the kind in question are known and need no further elaboration.

There are feed inlets 9 and 10 for feeding ore and coal to the reactor space 8. Another inlet 11 feeds reagents to the top of the standpipe 6. A suitable discharge control mechanism 12 is provided at the foot of the standpipe 6. Control mechanisms of this kind are well known and may take any one of a number of forms such as a plough and plate, or variable distance plate of screw conveyor.

The mechanism 12 regulates the flow of material from the pipe 6.

One or more cyclones, which may be suitably lagged, are provided either outside the reactor space or inside the freeboard above the level 7. As shown there is a cyclone 13 outside the reactor, but the underflow from the cyclone 13 is arranged to discharge into the top of the standpipe 6.

In use copper ore is fed to the reactor space by means of the feed inlet 9. Pulverized coal is fed by means of the feed inlet 10. The bed thus formed is first fluidized and brought to the required temperature by standard procedures. Thereafter ore and fuel are added continuously at a suitable rate. Heated ore overflows into and accumulates in the standpipe 6 where it is augmented by the discharge from the cyclone 13. In addition sodium chloride and more coal are also fed to the top of the standpipe 6 by means of the feed pipe 11.

In the standpipe 6 a more or less packed bed or plug is formed by the overflow from the fluidized bed. When mechanism 12 is operated to cause material to be discharged intermittently or continuously from the standpipe 6 the bed moves down gradually.

In effect then ore is introduced into the reactor space 8, heated to a predetermined temperature in that space, and then passed as a plug under sealed conditions to which reagents have been added, down the standpipe 6.

The important results flowing from the use of the apparatus of FIGURE 1 are the following:

(a) The ore can be heated to the optimum temperature before inception of the actual reaction;

(b) Should any copper sulphides be present in the ore, these are converted to the oxide state in the fluidized bed;

(c) Although combustion gases are not entirely excluded from the plug or packed bed, the volume per unit mass of ore is kept at a minimum. This in practice has shown no detrimental results;

(d) The residence time of the ore in the actual reaction zone (standpipe) can be kept as long or as short as may be required to effect optimum results on any given ore;

(e) The arrangement is flexible in that operating conditions can be altered to suit different types of ore, different concentrations of copper and so on.

Furthermore at least the upper part of the pipe 6 need not be extensively lagged and the content of the pipe 6 is in indirect heat exchange relationship with the material in the reactor space 8, so that the exothermic segregation process may contribute to the heat for heating up the ore. However, in practice it has been found that an arrangement like that of FIGURE 1 creates constructional and operational problems.

For the latter reasons the apparatus shown in FIGURE 2 has been designed.

In FIGURE 2 there is a fluidized bed reactor 20 of any suitable type. The interior of the reactor is unobstructed. The reactor 20 is fed with ore and coal through inlets 21 and 22. Heated material from the reactor 20 overflows into two external vertical vessels 23 each of which is controlled by a control mechanism 12 of the type mentioned above. Each vessel 23 has inlets 24 for coal and salt (sodium chloride).

The exhaust gases from the reactor 20 pass through cyclones 25 and the underflows of the cyclones are fed to the vessels 23. If necessary gas from the cyclones 25 can pass through secondary cyclones to recover solid particles that may have passed through the cyclones 25. These particles may be joined to the underflow from the primary cyclones.

The operation of the apparatus of FIGURE 2 is substantially the same as the apparatus of FIGURE 1.

The products from the apparatuses described above are discharged and cooled in a known way to prevent undue oxidation of the segregated copper. The product may be subjected to a light regrind and is then passed through flotation cells in a way normal in the segregation process.

The apparatus shown in FIGURE 1 has been used on ores of various compositions that contain between 1.6 and 3.5% copper. Once the fluidized bed was in operation ore was fed to the reactor space at the rate of between 750 and 920 lbs./hour. Fuel coal was added to the bed at the rate of 152 lbs. per ton of feed or 62.1 lbs./hour. Between 120 and 140 cubic feet per minute of air at 20° C. and 12.7 p.s.i. was used. The mid-bed temperature was about 830° C.

The discharge plough and plate at the foot of the standpipe was arranged to operate at intervals of between 60 to 95 seconds to give a retention time of 2 minutes or just more. The addition of sodium chloride varied from between 0.07 and 0.11% by weight of the net feed to the standpipe. Coal was added to the standpipe at a rate of not more than 0.3% by weight of the net feed. Best results were obtained with 0.2%.

It should be noted that the percentage additions of sodium chloride and coal do not form part of the present invention.

With the figures given above a satisfactory recovery of the copper was effected in a subsequent flotation step. An average of 92.67% of the copper in the ore was recovered.

I claim:
1. In a segregation process in which a metal compound-containing material is heated to a predetermined temperature and a halide-containing material and a reducing agent are added to the heated mass so that the metal segregates in the mass in metallic form, the improvement comprising fluidizing the metal compound-containing material while heating the same, withdrawing heated material from the fluidized mass, establishing material thus withdrawn in the form of a continuous sealed plug, moving said plug at a predetermined rate over a predetermined distance, and adding at least said halide-containing material to the last-formed portion of the plug.

2. A process as claimed in claim 1, in which reducing agent is also added to the last-formed portion of the plug.

3. A process as claimed in claim 1, in which heated material is withdrawn from the fluidized mass by allowing it to overflow from the mass.

4. A process as claimed in claim 1, in which said movement of the plug is by the action of gravity.

5. A process as claimed in claim 1, in which said reducing agent is carbon.

6. A process as claimed in claim 1, in which said halide-containing material is sodium chloride.

7. A process as claimed in claim 1, in which said metal is copper.

8. A process as claimed in claim 7, in which said copper-containing compound is present in the fluidized mass as copper oxide.

9. In a copper segregation process which comprises heating a copper compound-containing material to a predetermined temperature and adding to the heated mass sodium chloride and carbon so that copper segregates in the mass in metallic form, the improvement comprising fluidizing the copper compound-containing material while heating the same, withdrawing heated material from the fluidized mass by allowing the material to overflow, establishing the overflowed material in the form of a continuous sealed plug, moving said plug at a predetermined rate over a predetermined distance, and adding sodium chloride and carbon to the last-formed portion of the plug.

References Cited by the Examiner

UNITED STATES PATENTS

| | | | |
|---|---|---|---|
| 1,679,337 | 7/1928 | Moulden et al. | 75—72 |
| 2,481,217 | 9/1949 | Hemminger | 75—26 |
| 2,742,353 | 4/1956 | Ogorzaly | 75—26 |
| 2,797,155 | 6/1957 | Vaughn | 75—1 |
| 2,843,472 | 7/1958 | Eberhardt | 75—1 |
| 2,855,288 | 10/1958 | Cyr et al. | 75—9 |
| 2,890,106 | 6/1959 | Heath | 23—284 |
| 3,037,848 | 6/1962 | Davis | 23—284 |
| 3,118,757 | 1/1964 | Peras | 75—1 |

FOREIGN PATENTS

| | | |
|---|---|---|
| 528,131 | 7/1956 | Canada. |

BENJAMIN HENKIN, *Primary Examiner.*